(12) United States Patent
D'Alessandro

(10) Patent No.: US 7,969,962 B2
(45) Date of Patent: Jun. 28, 2011

(54) FINE TIME TRACKING WITH IMPROVED RESOLUTION

(75) Inventor: Pierluigi D'Alessandro, Davenport, FL (US)

(73) Assignee: ST-Ericsson SA, Plan-les Ouates (CH)

( * ) Notice: Subject to any disclaimer, the term of this patent is extended or adjusted under 35 U.S.C. 154(b) by 735 days.

(21) Appl. No.: 11/813,019

(22) PCT Filed: Dec. 21, 2005

(86) PCT No.: PCT/IB2005/054371
§ 371 (c)(1),
(2), (4) Date: Apr. 23, 2008

(87) PCT Pub. No.: WO2006/070320
PCT Pub. Date: Jul. 6, 2006

(65) Prior Publication Data
US 2008/0267164 A1    Oct. 30, 2008

(30) Foreign Application Priority Data
Dec. 28, 2004    (EP) .................................. 04107008

(51) Int. Cl.
*H04J 3/06*    (2006.01)
(52) U.S. Cl. ...................................................... 370/350
(58) Field of Classification Search .................. 370/350, 370/324, 395.62, 484, 503, 507–520; 375/354–376; 455/130–139
See application file for complete search history.

(56) References Cited

U.S. PATENT DOCUMENTS

| 2002/0034218 | A1 | 3/2002 | Papasakellariou et al. | |
| 2002/0127983 | A1* | 9/2002 | Black et al. | 455/135 |
| 2005/0041724 | A1* | 2/2005 | Chansarkar | 375/149 |

FOREIGN PATENT DOCUMENTS

| WO | 2003034090 A2 | 4/2003 |
| WO | 2004047327 A1 | 6/2004 |

OTHER PUBLICATIONS

Aue et al. ("A Non-Coherent Tracking Scheme for the Rake Receiver That Can Cope With Unresolvable Multipath" IEEE International Conference on Communications, 1999. vol. 3, Jun. 1999, pp. 1917-1921).*

Aue, V; et al "A Non-Coherent Tracking Scheme for the Rake Receiver That Can Cope With Unresolvable Multipath" IEEE International Conference on Communications, 1999. vol. 3, Jun. 1999, pp. 1917-1921.

* cited by examiner

*Primary Examiner* — Derrick W Ferris
*Assistant Examiner* — Mang Yeung
(74) *Attorney, Agent, or Firm* — Jeremiah J. Baunach; Seed IP Law Group PLLC

(57) ABSTRACT

The present invention relates to compensation method and circuit for compensating time drifts in a receiver suited for multi-path environment. The time drifts are separated into a first component common to groups of paths belonging to the same radio link, for example a radio link of a connection between a user equipment and a base station, and second components valid for each individual path belonging to a group. The first component is processed by employing first feedback means with a first bandwidth, and the second components are processed by employing a second feedback means with a second bandwidth, wherein the first bandwidth is set to a value higher than the second bandwidth. Thereby, the bandwidth of the loop devoted to the individual tracking of each path can be slower and adjusted to environmental conditions, so as to allow application of a principle of interference mitigation for improving time resolution.

14 Claims, 5 Drawing Sheets

```
Function Compute_B(Command_I)
For j=1.. Finger[RL]
  DT[j,RL]=DT[j,RL]+Command_I[j,RL]
End,
For (j=1..Finger[RL])
 For (i=1, Finger[RL])
  B(i,j,RL)=beta(|DT[i,RL]-DT[j,RL]|))
 End;
End;
```

FIG.4

```
beta[-9]=0.00899
beta[-8]=-0.0062
beta[-7]=-0.0361
beta[-6]=-0.0154
beta[-5]=+0.0361
beta[-4]=-0.0566
beta[-3]=-0.3899
beta[-2]=-0.7088
beta[-1]=-0.5940
    beta[0]=0
beta[1]=+0.5940
beta[2]=+0.7088
beta[3]=+0.3899
beta[4]=+0.0566
beta[5]=-0.0361
beta[6]=+0.0154
beta[7]=+0.0361
beta[8]=+0.0062
beta[9]=-0.0089
```

FIG.5

FINE TIME TRACKING WITH IMPROVED RESOLUTION

The present invention relates to a compensation circuit and compensation method for compensating time drifts in a receiver suited for operating in a multi-path environment by exploiting multipath diversity, such as a Rake receiver in a Universal Mobile Telecommunications System (UMTS).

In UMTS communication systems, at least one node B, which corresponds to a conventional base station device, and a mobile terminal referred to as user equipment (UE) are defined. Both the node B and the UE include a transmitter and a receiver. The node B sends signals by means of the node B transmitter to the UE receiver in the downlink. The UE transmitter sends signals by means of the UE transmitter to the node B receiver in the uplink. Several UEs may communicate with a single node B. In this case, the UEs are said to be in the same cell, wherein a cell represents a geographical area where a UE is served by a given node B.

In a so-called soft handover situation, the UE is in an overlapping cell coverage area of two cells belonging to different node Bs, so that communications between the UE and the node Bs take place concurrently via two air interface channels from each node B separately (or two radio links). Both channels or signals are received at the UE by maximal ratio combining Rake processing. In such a Rake processing, delay dispersive energy is combined by utilizing multiple so-called Rake fingers (correlation receivers) allocated to those delay positions at which significant energy arrives. To achieve this, time delay positions at which significant energy arrives are identified in an initial acquisition phase and correlation receivers or Rake fingers are allocated to those peaks. The measurement grid for acquiring the multi-path delay profile is in the order of one chip duration with an update rate in the order of some tens of milliseconds. A chip corresponds to a spread symbol, wherein the duration of a chip period is smaller than the duration of a symbol period by a factor approximately equal to the bandwidth expansion factor of a spreading operation used in Wideband Code Division Multiple Access (WCDMA) modulation used in UMTS transmission. The bandwidth expansion factor is equal to the number of chips per symbol period and is referred to as spreading factor. Within each correlation receiver, fast-changing phase and amplitude values of received signals are tracked and removed. Finally, demodulated and phase-adjusted symbols are combined across all active Rake fingers and presented to a decoder for further processing. The channel-compensated symbols can be simply summed together to recover the energy across all delay positions. The radio frequency signal is then demodulated to generate a digital base-band signal. The base-band signal is processed to recover the useful information data intended for the user of interest.

Regarding time synchronization in a UMTS receiver, relevant aspects comprise maximum speed at which the receiver must operate and time drifts due to lack of synchronization between the receiver (Rx) oscillator and the transmitter (Tx) oscillator. The movement of the receiver leads to time drifts in the received symbols depending on the propagation delay as a result of the distance between transmitter and receiver. On the other hand, typically the Rx oscillator is not perfectly synchronized with the Tx oscillator, which also implies time drift in the local clock used in the receiver itself. In particular, the above second aspect (Tx/Rx frequency offset) may be critical in systems like UMTS, where the UE may be operating in soft handover, so that more than one physical connection could be simultaneously active with more than one node B. In such a case, the frequency offset between different node Bs cannot be removed by the received signal, even if techniques such as frequency offset estimation and compensation are employed at the receiver. Furthermore, the ability to cope with drifts due to frequency offset relaxes the requirements and than the cost of the local oscillators and the circuits to control them.

Radio propagation in mobile communication channels is characterized by multiple reflections, diffractions and attenuations of the signal energy. These are caused by natural obstacles such as building, hills, and so on, resulting in so-called multi-path propagation. The multi-path propagation leads to a broadening of signal energy due to different propagation paths having a delay profile which extends over several microseconds. On the other hand, signal cancellation, called fast-fading, takes place as the receiver moves across even short distances. A signal cancellation is best understood as a summation of several weighted phasors that describe the phase shift and attenuation along a certain path at a certain time instant. This multi-path fading environment represents a further challenge for time synchronization tasks. For achieving diversity gain in the Rake receiver, as much as possible resolvable paths must be tracked and combined to achieve best possible advantage of the used transmission bandwidth. Therefore, it must be assured that the receiver is capable of discriminating and tracking paths whose relative delays are in the order of one chip (i.e. the inverse of the bandwidth). In multi-path scenarios a stronger path can dominate over weaker surrounding paths due to fading, so that time tracking fails to track weaker paths. An improved fine-time synchronization is thus desired.

Document US 2002/0034218 A1 discloses a spread spectrum time tracking scheme where time tracking units with decision statistics are mitigating or correcting for influences from nearby interfering paths. Interference mitigation is accomplished by appropriately selecting the parameters of the time tracking unit so that the contribution of the interference on the decision statistics of the time tracking unit is minimized. Interference cancellation is accomplished by evaluating and subtracting the effect from interfering paths on the decision statistics of the time tracking unit. The decision statistics are formed by first coherently averaging the known symbol stream of a pilot signal or of a demodulated data signal for a time period over which the phase distortion introduced by the channel remains approximately constant. The non-coherent averaging that follows provides the simplest implementation for the removal of the phase dependence from the decision. Non-coherent averaging is basically performed by averaging the magnitude of the coherently averaged signal. The update rate is lower bounded by requirement to provide immunity to the decision statistics against fading and it is upper bounded by the requirement for the time drift between successive update rates to be adequately smaller than 0.5 samples. The latter requirement takes precedence over the former whenever both of them cannot be fulfilled. This means that in the presence of high frequency offsets and at low speeds, the approach proposed in this prior art will offer poor performance.

It is an object of the present invention to provide an improved time synchronization scheme by means of which a desired time resolution in terms of ability in tracking close paths can be achieved while assuring also a desired degree of resistance to high residual frequency offset and noise.

This object is achieved by a compensation circuit as claimed in claim 1 and a compensation method as claimed in claim 7.

Accordingly, resolution of time synchronization is improved by separating time drifts due to frequency offsets from time drifts due to changes in the propagation conditions. A dual feedback structure is proposed in which common drift and differential drift are tracked by providing feedback with different bandwidths. This serves to separate the frequency offset time drifts from time drifts due to Doppler spread by relying on the different characteristics of these two time drifts. Even when there is only one path for a radio link, the "common" loop still operates at "high rate" on that path. Hence, the wording "all received paths" or "group of paths" is considered to cover at least one path depending on the hardware complexity and belonging to a radio link, where the receiver can manage from at least one radio link and depending on the hardware/software complexity.

The proposed solution can be applied in a complete transparent way with respect to the number of paths which are received. Note that the number of paths is very variable from case to case and even during a connection, whereas the number of fingers which corresponds to the maximum number of paths which can be received, is constrained by the hardware/software complexity, like the maximum number of radio links which can be considered.

The time drifts may be obtained from at least one incoherent early-late gate. Thereby, the proposed processing can be applied to the early-late error obtained by a conventional incoherent early-late gate, so that hardware modifications can be minimized. Furthermore, the different received paths may comprise respective fingers of a Rake receiver. This provides the advantage that the proposed procedure can be implemented in a conventional Rake receiver by post-processing the measurements returned from the conventional incoherent early-late gate. The procedure may thus be implemented by providing specific software routines controlling a processor in the receiver.

The first and second feedback means may be provided in a dual-loop delay locked loop (DLL). Thereby, a dual loop arrangement is achieved, wherein one of the loops is fast and generates the same commands for all received paths belonging to a radio link, while the other loop is slow and generates individual commands for each received path.

Additionally, control means may be provided for applying a common control signal to all of said at least two different received paths and applying individual control signals to individual ones of said at least two different received paths, in response to processing outputs of said first and second feedback means. In this case, the common and individual control signals may comprise up and down commands for delay control. Thus, the control means is able to process the processing outputs and to generate control signals for all received paths and/or for individual received paths without requiring substantial modification of the conventional receiver architecture.

Interference mitigation may be applied to the processing results of the processing step for processing the first component common to the at least two different received paths. Thereby, an interference mitigation principle is applied to the differential time drifts, which correspond to residual time drifts after the common time drift has been compensated.

Coefficients may be estimated, which connect path strengths of the at least two received paths with respective ones of the time drifts. According to a first example, this estimation may be based on a determination of cross variances between the path strength and the respective ones of the time drifts. As an alternative second example, the estimation may be based on an estimation of relative delays between different ones of the at least two received paths (predicted coupling coefficients).

The ratio between the first and second bandwidth may be adapted to environmental conditions. Thereby, the influence of environmental conditions such as frequency offset, Doppler spread, etc. can be considered to optimize or fine-tune the time synchronization inspiration.

The present invention will now be described in greater detail based on a preferred embodiment with reference to the accompanying drawings in which:

FIG. 4 shows an example of a program routine for determining predicted coupling factors used in the preferred embodiment;

FIG. 5 shows a list of β-coefficients used for predicting coupling factors;

Figure 1:
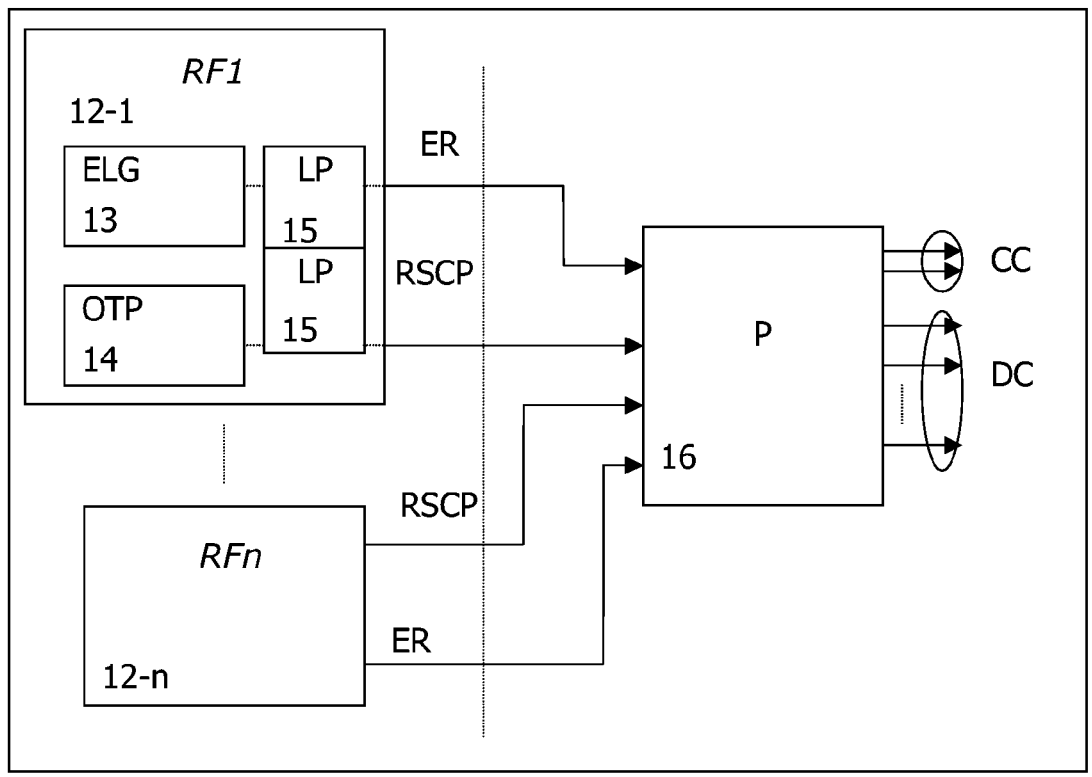
FIG. 1 shows a receiver architecture according to the preferred embodiment.

The preferred embodiment will now be described in connection with a UMTS Rake receiver which is a well-known, low-complexity receiver structure for receiving CDMA signals. It attempts to gather as much signal power as possible by identifying several scattered and reflected replicas of a transmitted signal and assigning separate correlators to each of them, the so-called Rake fingers. The finger outputs are weighted and combined constructively to yield estimates for the transmitted symbols.

A crucial task in every Rake receiver is the synchronization, meaning the estimation and compensation of the channel-induced attenuation, phase shift and path delay in each Rake finger. The path delay estimation is usually performed in two steps: in a coarse acquisition, the paths detected are assigned to different fingers of the rake receiver; typically an error in synchronization of ½ of chip is allowed in this step. Following coarse acquisition, fine tracking allows the exact synchronization of the finger to the path delay (typically, a mean error of ⅛ of chip can be achieved). One tracking structure which has received much attention is the early-late gate timing error detector. A digital interpolator/decimator generates a data stream at an estimated timing instant at a rate which is an integer multiple of the chip rate, which is subsequently demultiplexed and fed to a detection path and a synchronization path, the latter being shifted by a fraction of the chip period with respect to the former. This time shift is often called the early-late gate timing offset. In the synchronization path, correlation with the spreading sequence and symbol-rate sampling are performed on early and late data streams, the early stream being generated by delaying the late stream by one sample. Furthermore, data modulation and complex channel phasor effects are compensated for by multiplying the on-time sample with complex conjugate reconstructed pilot symbols, or channel phasors (provided by the channel estimation). Following different implementation alternatives, the early late samples can be multiplied by the estimated channel phasors, or not. In the present case, we consider the case in which these samples are simply squared, by removing in this way the influence of the frequency offset and the channel estimation error. The difference between the low pass filtered squared early and late samples is then used to compute an early-late error.

One considerable drawback of the conventional early-late structure is its sensitivity in multi-path fading environments. Apart from being subject to an increased timing jitter, delay estimates from adjacent Rake fingers tend to converge to the same value if their delay difference lies in the order of the chip duration. In that case, a central control unit would remove this Rake finger with the weaker power from the detection process. The resulting bit-error performance is severely degraded due to the facts that the receiver looses signal power and diversity; furthermore the remaining finger is subject to severe multi-path distortion because it will track the resulting envelope of two paths. An improved structure is therefore necessary in order to increase receiver performance.

According to the preferred embodiment, the conventional UMTS receiver is improved to achieve the desired time resolution in terms of ability in tracking paths with relative delays of the order of one chip, while assuring also a desired degree of resistance to high residual frequency offset and noise. This is achieved by separating time drifts in two main components, one common to all paths or fingers, and one valid for each individual path or finger. Hence, common errors and differential errors are separated, while the common errors are processed and compensated by employing a loop with higher bandwidth. The common errors include mostly effects due to frequency offsets. The bandwidth of the loop devoted to individual tracking of each path and thus to differential errors can be lower and adjusted to environmental conditions. It is in charge of tracking the residual time drifts after correction of the common drift. This allows the possibility of dimensioning the bandwidth of an individual loop to the Doppler spread, and then the application of a principle of interference mitigation for improved time resolution.

In the proposed dual loop delay locked loop (DLL) the ratio between the bandwidth of the faster loop (common loop) which generates common commands (CC) for all paths or fingers belonging to a radio link and the bandwidth of the slow loop (differential loop) which generates individual commands for each path or finger can be adapted to the environmental conditions (frequency offset versus Doppler spread).

The above principles can be implemented in a conventional Rake receiver architecture, which is able to implement an incoherent early-late gate correlator per finger, and provide measurements of the received signal coded power (RSCP) as required from other basic functions to be implemented by the standard specification. The degree of hardware/or software complexity is thus very limited compared to other solutions solving similar problems.

FIG. 1 shows a schematic block diagram of a Rake receiver according to the preferred embodiment. The receiver comprises a plurality of Rake fingers 12-1 to 12-n, each comprising a conventional early-late gate 13 and a conventional on-time processing unit 14 which are both followed by respective low pass filters 15. The low pass filters 15 may be implemented as digital filters, e.g. finite impulse response (FIR) filters or infinite impulse response (IIR) filters, wherein the upper low pass filter may additionally comprise square means for squaring the output value of the low pass filter.

The early-late gate 13 generates an error value ER which is filtered and squared at the upper low pass filter 15. The on-time processing unit 14 generates an RSCP value of the received signal power, which is also filtered by the lower low pass filter 15. The error values ER and the RSCP values of each Rake finger are supplied to a processing function or unit 16 which comprises a common loop and a differential loop, wherein the common loop generates common commands (CC) supplied to all Rake fingers belonging to a radio link and the differential loop generates differential commands (DC) supplied individually to respective Rake fingers.

The dotted line in the center of FIG. 1 separates the left portion as a part implemented on specific hardware, namely the Rake receiver part, from a right part representative of a typical controller. The specific hardware of the left portion can have a conventional structure, while the function of the right portion can be implemented on a controller. Thus, the processing function performed by the processing unit 16 may be controlled by a software routine stored in a memory of the processing unit 16 or may be implemented as a hardware structure for performing digital signal processing according to the processing function.

Figure 2:
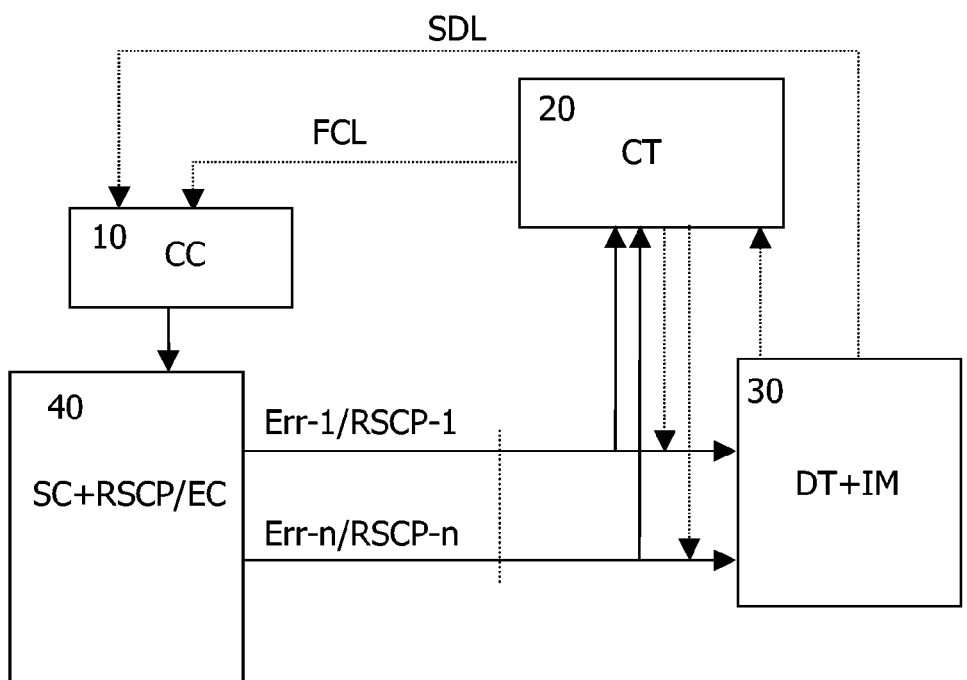
FIG. 2 shows a schematic block diagram of a joint common and differential tracking circuit according to the preferred embodiment.

FIG. 2 shows a schematic block diagram of the tracking procedure as performed in the Rake receiver of FIG. 1. A Rake receiver portion 40 having a sampling controller function and a RSCP and error computation function generates error values Err-1 to Err-n corresponding to tracking errors or time drifts in the respective Rake fingers, and generates corresponding RSCP values RSCP-1 to RSCP-n, which are supplied to a first feedback function or unit 30 arranged to perform differential tracking and interference mitigation. The differential feedback unit 30 generates a command signal supplied via a slow differential loop SDL to a command combining function 10. Additionally, the output errors Err-1 to Err-n and the corresponding RSCP values RSCP-1 to RSCP-n of the Rake fingers are supplied to a common feedback function or unit 20 for common tracking which generates output commands supplied via a fast common loop FCL to the command combining unit 10. At the command combining unit 10, the commands generated by the differential feedback unit 30 and the common feedback unit 20 are combined and supplied to the Rake receiver unit 40 to thereby close the dual feedback loop and enable a joint common and differential tracking for time synchronization.

A basic aspect of the preferred embodiment is that the time drifts due to the residual frequency offset and the time drifts due to the motion of the UE with respect to the node B have different characteristics. As a consequence of the residual frequency offset, for a given radio link, i.e. physical connection between a node B and a UE, the time drifts in all the paths belonging to the radio link are basically the same, and the relative delays between paths due to this component do not change substantially. Time drifts due to the relative motion are different for each path, as they are dependent on the direction of arrival and on the speed of the motion. Different characteristics can also be derived for the rate of change, starting by the requirements given for the maximum speed and the maximum frequency offset foreseen for the connection or radio link. Based on these differences, the structure of FIG. 2 has been derived for time tracking. Basically, a common drift tracking on paths belonging to the same radio link is performed to estimate and compensate for the time drifts which are common to all paths (i.e. Rake fingers) belonging to a given radio link, mainly frequency offset drifts. A further differential loop or differential drift tracking is applied for estimating and compensating individual time drifts which cannot be compensated by the common loop. An interference mitigation processing is then applied to filter the errors processed by the differential loop in the differential feedback unit 30, which is possible in virtue of the smaller bandwidth required for this loop to work.

The integration length for the differential feedback unit 30, i.e. its bandwidth, does not have to take into account the frequency offset but only the channel coherence time, which is directly proportional to the inverse of the speed, and then inversely proportional to the time drifts. Thereby, the tracking scheme can be generalized when employed together with a Doppler bandwidth estimation, as explained later.

The common feedback unit 20 may be based on a non-coherent tracking scheme for Rake receivers, as described for example in "A non-coherent tracking scheme for the Rake Receiver that can cope with unresolvable multi-path", V. Aue, G. Fettweis, IEEE, 1999.

According to the preferred embodiment, basic constraints of the above conventional non-coherent tracking scheme have been removed, such as the temporal "equidistance" of the different paths and the fact that the relative delays of the paths may not change. Also, as will be seen later, the formula considered for the joint error is different in the preferred embodiment.

The advantages implied by the structure of the preferred embodiment according to FIG. 2 can be derived starting from the relationship between the channel coherence time and the Doppler bandwidth, as given in the following equation:

$$T_c \propto \frac{1}{B_D} \quad (1)$$

The Doppler bandwidth BD is proportional to the relative speed between the UE and the Node B and inversely proportional to the wavelength γ of the received signal, as expressed in the following equation:

$$B_D = \frac{v}{\lambda} \quad (2)$$

In case of relative motion or movement between the UE and the node B, a drift in the paths delay due to the changing of the lengths of the propagation paths between the UE and the node B occurs. The distance D which corresponds to a minimum drift $T_R$ which the receiver can compensate is given by:

$$D = T_R \cdot c \quad (3)$$

It is noted that the time resolution allowed to the receiver is linked with the sampling rate, which is typically a multiple of the inverse of the transmission bandwidth or the chip rate for systems employing a WCDMA modulation.

The integration time, which is the time available to the receiver for processing synchronization errors before generating a command, can be derived as follows:

$$\frac{D}{v} = \text{Int\_time}$$

By using equation (2), the following equation can be obtained:

$$\text{Int\_time} = \frac{D}{B_D \cdot \lambda} \quad (4)$$

And from equation (1) it can be obtained:

$$\text{Int\_time} \propto \frac{D}{\lambda} \cdot T_c \quad (5)$$

It can now be seen that in the presence of a time drift due to only relative speed it is possible to select an integration time which is proportional to the channel coherence time. In cases where the integration time is upper bounded by the frequency offset, this possibility is not assured. As described in the following, this property can be used to add to the processing of errors returned by the conventional early-late gate 13 an additional low complexity method for interference cancellation, and then, to increase the time resolution.

The task of the fast common loop FCL is to track the component of the time drift which is common to a group of paths, in such a way that the residual drifts for each path have the desired statistical characteristics to be efficiently processed by the slow differential loop SDL. To derive the characteristics of one of the possible approaches for the common loop tracking, it is assumed that path delays are drifting by $\Delta\tau_i$, and that the common drift $\Delta\tau_C$ can be compensated and is the same for all paths.

Assuming that in a receiver employing maximum ratio combining, the loss due to imperfect synchronization can be expressed as the difference between the total signal power (after combining) in the case of perfect synchronization and the signal power which is available after the combining and which includes a synchronization errors, the following form for the error driving the common loop can be derived:

$$E_C = \frac{\sum_{i=1,N} E_i}{\sum_{i=1,N} ch_i^2} \quad (6)$$

This equation (6) expresses the fact that the error optimal for the common loop is the sum of the early-late (non-coherent) errors $E_i$ measured in each Rake finger, wherein $ch_i$ denotes the channel phasor for the path i.

In the following, the tracking of individual paths is focused as a means for tracking drifts of each single path, once the common drifts are compensated by the fast common loop FCL. These errors are slowly varying and for their detection an integration interval can be assumed which is proportional to the channel coherence time. In this hypothesis, the following equation can be derived which is expresses the dependence between the path strength and the errors:

$$E_{i,M} = E_{i,T} + \sum_{r_i \neq j} \beta_{i,j} \cdot R_j \quad (7)$$

wherein $E_{i,M}$ designates the mean value of the measured error and $E_{i,T}$ designates the mean value of the true error, $\beta_{i,j}$ designates coefficients depending on the relative delays between the paths, $R_j$ designates the mean value of the strength of a given path. Assuming a measurement of the errors and the path strength in equation (7) on a given interval, this equation (7) can be used for deriving $E_{i,T}$ from $E_{i,M}$ and remove the interference caused by other paths on the synchronization error, before computing, on the basis of this error itself, the next sampling point.

It can be shown that equation (7) can be used to derive the following equation:

$$\beta_{i,j} = \frac{\text{Cross}(e_{i,M}, r_j)}{\text{Var}(r_j)} \quad (8)$$

where Cross indicates the cross covariance between errors and path strengths, and Var indicates the variance. The small letters for the error and the path strength indicate that it is referred to instantaneous quantities or to mean values computed on intervals smaller than the channel coherence time. The statistics implied in Eq. (8) on the other side, are extracted on intervals which are bigger than the channel coherence time.

It can be shown that the coefficients $\beta_{11}, \beta_{12}, \ldots$ which give the dependence between the mean values of the errors and the path strengths are given by $$\hat{\beta}_{11} = h^2(t_{s1}^+ - \hat{t}_1) - h^2(t_{s1}^- - \hat{t}_1) \quad (9)$$

$$\hat{\beta}_{12} = h^2(t_{s1}^+ - \hat{t}_2) - h^2(t_{s1}^- - \hat{t}_2)$$

wherein $t^+_{s1}$, $t^-_{s1}$ are the early and late sampling times for the late and early samples on a first path 1, and $\hat{t}_1, \hat{t}_2$ are the estimated delays for path 1 and 2. Equation (9) relates to estimated delays which can be used as approximation of the true delays in case of good sampling conditions. The values used for the path delays are the estimated delays at the previous step, which are used as prediction for the present delays. This is equivalent to an assumption that the synchronization error is zero.

A low complexity implementation of the compensation or tracking procedure can be considered, in which only the predicted coefficients are considered. This reduced solution can be less robust than one which uses also the measured correlation. However, link level simulations performed in the test conditions given for UMTS indicate that it can still lead to very good performances, and can thus represent a reduced complexity variant of the proposed procedure.

In the following, a possible procedure for merging predicted and measured coefficients on the basis of the reliability of these two estimates is described.

So far, two ways have been described for determining the coupling factors between path strengths and errors measured on given paths. If $\beta^P_{i,j}$ are the predicted coefficients and $\beta^M_{i,j}$ are the measured coefficients, an optimal way to merge the two to obtain the best estimate for $\beta_{i,j}$ can be derived taking into account the respective variances of the predicted and measured coefficients. A sub-optimal way which requires only the computation of the variants for the measured coefficients is given in the following.

The cross correlation terms in equation (8) can be calculated or determined by filtering for example with IIR filters the product between the RSCP values and the errors. By performing this operation, the variants of the output of the filter can be estimated.

Assuming that $\sigma^2_{M,i,j}$ denotes the variance of $\beta^M_{i,j}$, the following two coefficients can be defined:

$$C_1 = \frac{\sigma^2_{M,i,j}}{\sigma^2_{M,i,j} + 1}$$

$$C_2 = 1 - C_1 = \frac{1}{\sigma^2_{M,i,j} + 1}$$

Then, the coefficients $\beta_{i,j}$ can be obtained by the following equation:

$$\beta_{i,j} = C_1 \cdot \beta_{i,j}^P + C_2 \cdot \beta_{i,j}^M \quad (10)$$

A version for improved performance of the procedure can be derived by considering the effects on the path strength due to the close paths. These effects can be important when the time resolution is lower than one chip. In this case, the cross correlation terms between RSCP of different paths can be important, besides the cross correlation between RSCP and errors, and by neglecting them the errors become relevant.

Figure 3:
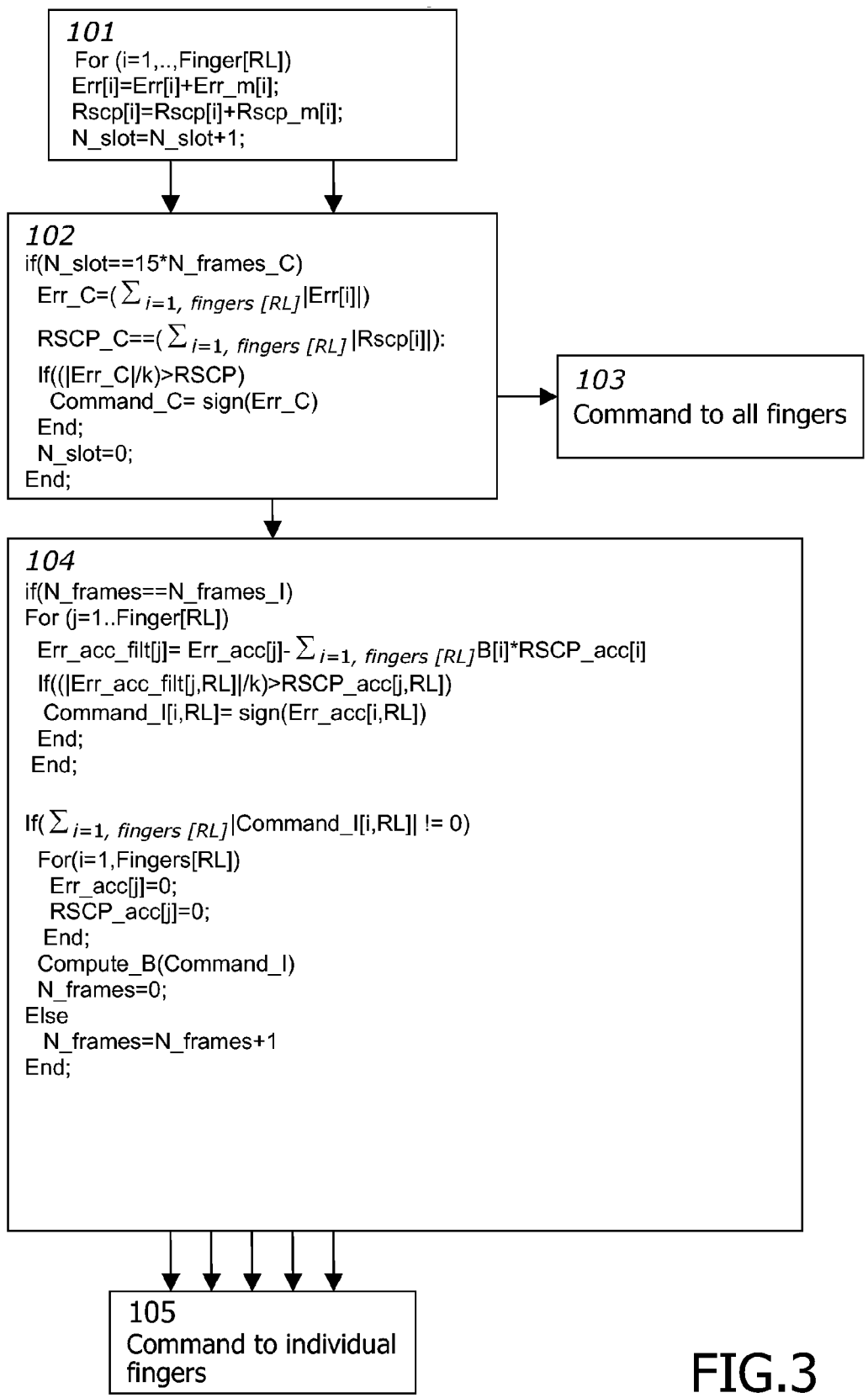
FIG. 3 shows an implementation example of a compensation method according to the preferred embodiment.

FIG. 3 shows a schematic flow diagram of the proposed compensation or tracking procedure including the basic operations and respective examples for software routines controlling the processing unit 16 in FIG. 1.

In step S101, error values Err[i] and RSCP values Rscp[i] are determined for each slot of a transmission channel. The obtained error and RSCP values are processed in a common loop step 102 where a common error Err_C and a common RSCP value RSCP_C are obtained by summing absolute values over all Rake fingers. Then, a common command Command_C is generated, which corresponds to the sign of the common error Err_C, i.e. up-command or down-command. This common command is supplied in step S103 to all Rake fingers 12-1 to 12-n in FIG. 1. Then, a differential loop step 104 is performed, in which individual or differential errors Err_acc_filt[j] are calculated for each Rake finger and based on the sign of these errors, differential commands (i.e. up-commands or down-commands) for the individual Rake fingers are determined and supplied to the individual Rake fingers 12-1 to 12-n in step 105. In FIG. 3, Rscp[I] denotes the RSCP value of finger i, Err[i] denotes the error value of finger i, N_frame_C denotes the number of frames for the common loop, and N_frame_:I: denotes the number of frames for the differential loop.

FIG. 4 shows an implementation example of a software routine for determining predicted coupling factors B(i,j,RL) as coupling coefficients for each path, wherein RL denotes the radio link and Fingerf[RL] denotes an identifier for each finger allocated to the radio link.

FIG. 5 shows a table of beta values which can be used in the above prediction of the coupling factors.

In summary, a joint error is derived for driving the common loop. From the characteristics of this error it follows that short term effects due to channel variations are not visible even if the error is computed on an interval short with respect to the channel coherence time. Consequently, the common loop can work with a higher bandwidth than the differential loop. It is worth noting that more refined methods can be applied for deriving an estimate of the common drift, and that the one derived in the preferred embodiment represents a good compromise between complexity and performance. In reference to the residual errors processed by the differential loop, a linear dependence can be considered between the early-late error measured on a given path and the power of the close paths, as indicated in equation (7). This relationship holds if the interval considered for the measurements is big with respect to the channel coherence time, which is dependent on the speed of the UE with respect to the node B.

Two ways are provided for estimating the coefficients which connect the path strengths to the error measured on each path. A first way based on the online computation of cross variances between the path strengths and the errors (measured), and a second way in which the coefficients of this dependence are computed by the estimated relative delays between the paths (predicted cross correlation coefficients). Furthermore, a way is given for merging measured and predicted cross correlation, and to filter out the terms in the errors computed on each path by the influence of the close paths. A compromise possible for reducing complexity, in which only the predicted coefficients are used, is outlined and has been considered as a first step for implementation of the proposed procedure. Furthermore, a criteria for online adaptation of some parameters upon which the procedure is based has been described, which can take into account the propagation conditions to optimize the tracking response time versus resolution. Measurements performed for the tracking individual paths can be used to refine the estimates on which the common tracking loop is based; it can be shown that in the case of very close paths, the expression of the common error given by the equation (6) is biased, and the bias can be removed by taking into account the RSCP of each path and the $\beta_{i,j}$ coefficients, which are slowly varying and are processed by the individual loop. The common loop output which mainly tracks the effect of the frequency offset on the more energetic paths, can be used to refine the frequency offset estimation itself, which is related to the common drift and typically is also performed in a separate unit of the receiver. It is possible to increase the performance of the procedure by increasing the complexity, wherein the increased performance is intended in ability to track paths with relative delays less than one chip. Even in the more simple form, the procedure is able to track separately paths which are at a relative delay of less than one chip, e.g., 0.8 chips.

Figure 6:
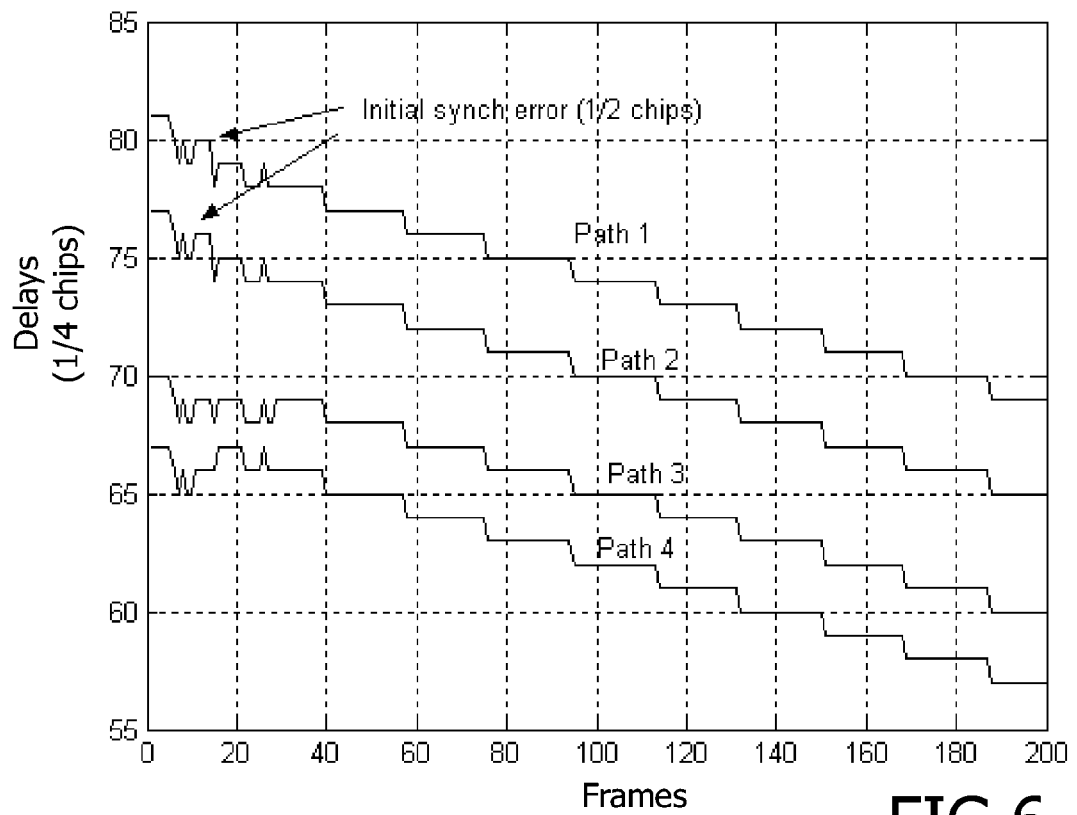
FIG. 6 shows a schematic diagram indicating synchronization results related to a standard propagation case.

FIG. 6 shows a diagram indicating delays versus frames and relating to tracking results in the specific propagation case number 3 of the 3GPP (3rd Generation Partnership Project) conditions, which corresponds to four paths at one chip difference. At the beginning, a synchronization error is present on the two strongest paths. This synchronization error on energetic paths is tracked by the common loop in a fast way. Then, the differential loop corrects the timing of paths No. 3 and 4 in such a way that alignment is achieved starting from about frame No. 30 (slow correction). From that point on the common loop is tracking the common drift due to the residual frequency offset which is assumed equal to 700 Hz in the simulation.

Figure 7:
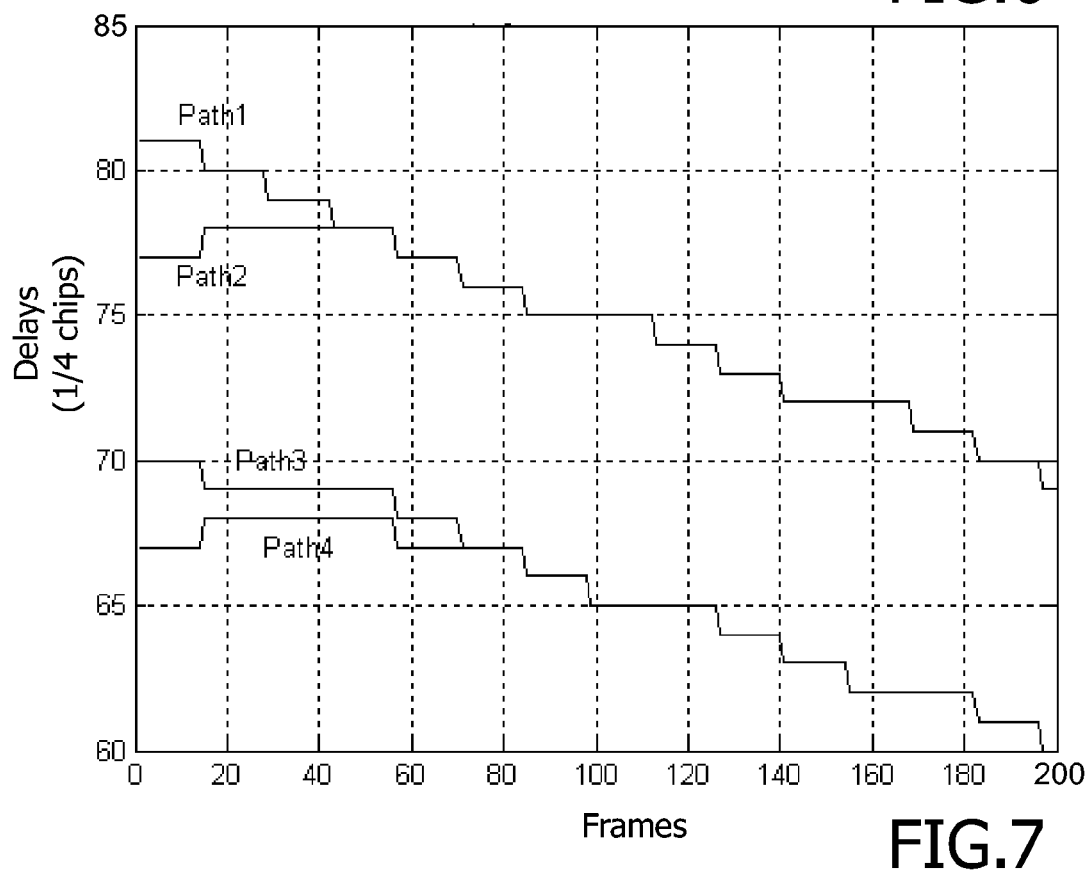
FIG. 7 shows a schematic diagram indicating synchronization results related to a standard propagation case extracted from 3GPP specifications, including 4 paths at 1 chip of relative delay, without the processing according to the preferred embodiment.

FIG. 7 shows the same performance obtained with a conventional early-late gate without the path processing of the preferred embodiment. As can be gathered from FIG. 7, path No. 1 and 2 and paths No. 3 and 4 collapse one on the other after 50 and 70 frames, respectively. This indicates that time resolution of the conventional scheme is not sufficient.

Figure 8:
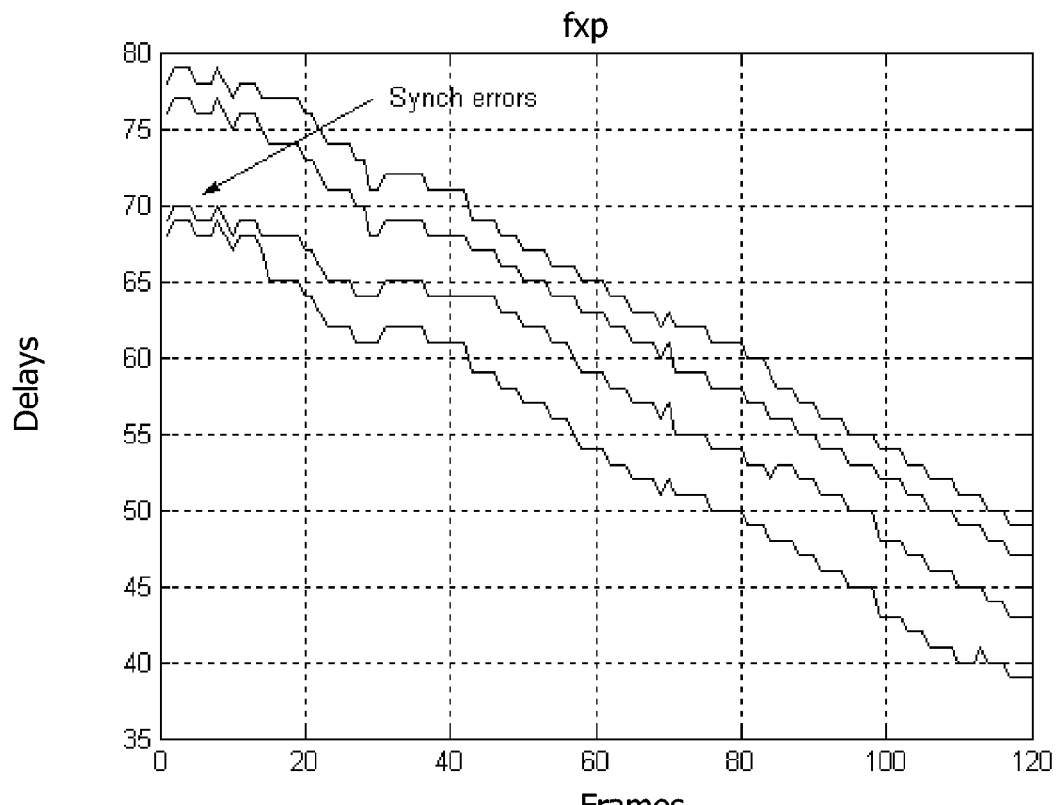
FIG. 8 shows a schematic diagram indicating synchronization results in standard conditions of high frequency offset.

FIG. 8 shows a similar diagram indicating the performance at very high frequency offset of 3.500 Hz. The DLL is still able to track and even to recover from initial synchronization errors.

Figure 9:
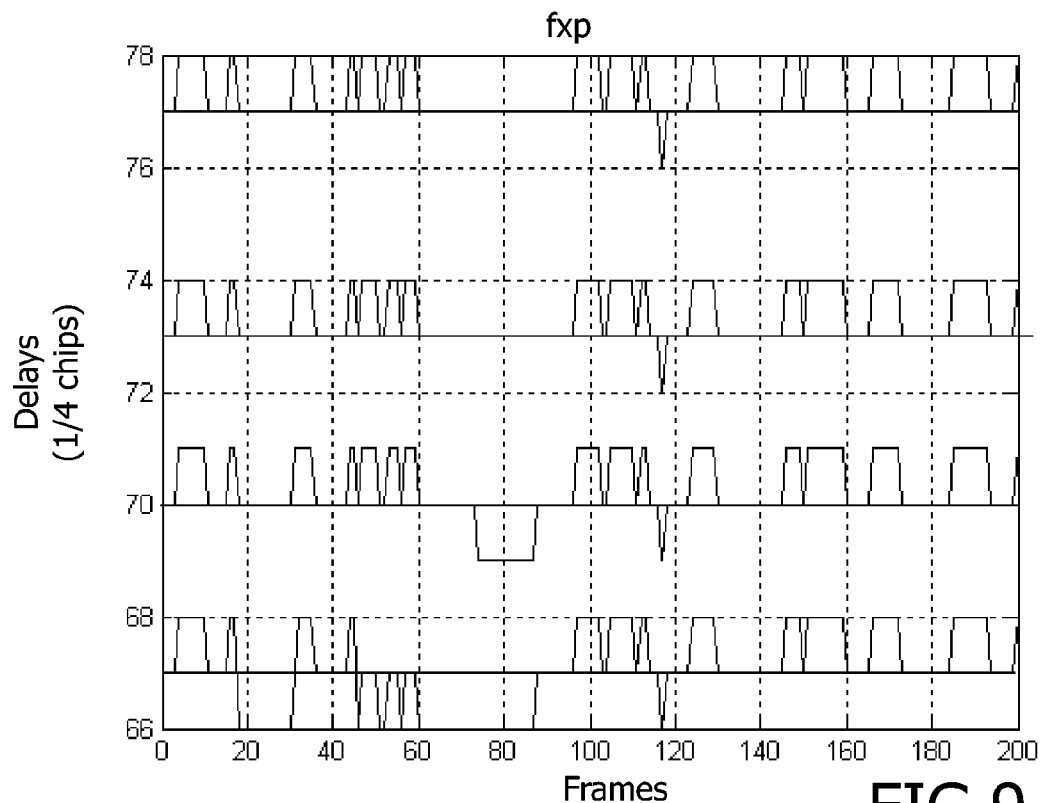
FIG. 9 shows a diagram indicating time tracking performance for a case of relative delays between paths of less than one chip.

Finally, FIG. 9 shows the ability of the proposed tracking or compensation procedure to track paths which are closer than one chip, e.g., 0.8 chips.

It is noted that the present invention is not restricted to the above preferred embodiment and can be applied to any tracking or compensation procedure for compensating or tracking time drifts in a receiver suited for multipath scenarios. The preferred embodiment may thus vary within the scope of the attached claims.

It will further be noted that the above mentioned embodiment illustrates rather than limits the invention, and that those skilled in the art will be capable of designing many alternative embodiments without departing from the scope of the invention as defined in the dependent claims. In the claims, any reference signs placed in parenthesis shall not be construed as limiting the claims. The words "comprising" and "comprises", and the like, do not exclude the presence of elements or steps other than those in any claim or the specification as a whole. The singular reference of an element does not exclude the plural reference of such elements and vice versa. If certain measures are recited in mutually different dependent claims, this does not indicate that a combination of these measures cannot be used the advantage.

The invention claimed is:

1. A compensation circuit for compensating time drifts in a multi-path receiver environment, said compensation circuit comprising:
   first feedback means arranged for processing a first component of said time drifts in the multi-path receiver environment at a higher bandwidth, said first component being a common time drift component and able to affect all paths belonging to a radio link; and
   second feedback means arranged for processing second components of said time drifts in the multi-path receiver environment at a lower bandwidth that is different and lower than the higher bandwidth, said second components being differential time drift components and respectively valid for each individual one of said paths belonging to said radio link, wherein at least two received paths of said paths belonging to the radio link comprise respective fingers of a Rake receiver.

2. A compensation circuit according to claim 1, wherein said time drifts are obtained from at least one incoherent early-late gate.

3. A compensation circuit according to claim 1, wherein said first and second feedback means are provided in a dual-loop delay locked loop.

4. A compensation circuit according to claim 1, further comprising control means for applying a common control signal to groups of received paths, each group belonging to a Radio link, and an individual control signal to individual paths in response to processing outputs of said first and second feedback means.

5. A compensation circuit according to claim 4, wherein said common and individual control signals comprise up and down commands for delay control.

6. A method of compensating time drifts in a receiver suited for a multi-path environment, said method comprising the steps of:
   separating said time drifts in the receiver suited for the multi-path environment into a first component, said first component being a common time drift component which is common to at least one group of paths including at least two received paths and second components, said second components being differential time drift components and respectively valid for each individual path of said at least one group of paths, wherein the at least two received paths comprise respective fingers of a Rake receiver;
   processing said first component by employing first feedback means with a first bandwidth;
   processing said second components by employing a second feedback means with a second bandwidth; and setting said first bandwidth to a value different and higher than said second bandwidth.

7. A method according to claim 6, further comprising the step of deriving said time drifts from an early-late error determination step.

8. A method according to claim 6, further comprising the step of applying interference mitigation to the processing results.

9. A method according to claim 6, further comprising the step of estimating coefficients which connect path strengths and path errors.

10. A method according to claim 9, wherein said estimation is based on a determination of cross variances between said path strengths and path errors.

11. A method according to claim 9, wherein said estimation is based on an estimation of relative delays between different ones of said at least two received paths.

12. A method according to claim 6, further comprising the step of adapting a ratio between values of said first and second bandwidths to environmental conditions.

13. A non-transitory computer readable storage medium having computer-executable instructions stored thereon that, when executed by a computer processor, cause the computer processor to perform a method of compensating time drifts in a receiver suited for multi-path environment, the method comprising:
separating said time drifts in the receiver suited for the multi-path environment into a first component, said first component being a common time drift component which is common to at least one group of paths including at least two received paths and second components, said second components being differential time drift components and respectively valid for each individual path of said at least one group of paths, wherein the at least two received paths comprise respective fingers of a Rake receiver;
processing said first component by employing first feedback means with a first bandwidth;
processing said second components by employing a second feedback means with a second bandwidth; and
setting said first bandwidth to a value higher and different than said second bandwidth.

14. The non-transitory computer readable storage medium according to claim 13, wherein said instructions, when executed by the computer processor, further cause the computer processor to adapt a ratio of values between said first and second bandwidths to environmental conditions.

\* \* \* \* \*